E. D. MACKINTOSH.
CENTRIFUGAL MACHINE UNLOADER.
APPLICATION FILED SEPT. 4, 1914.

1,205,128.  
Patented Nov. 14, 1916.

WITNESSES  
Frank J. Creed  
C. Van Name

INVENTOR  
Edward D. Mackintosh

UNITED STATES PATENT OFFICE.

EDWARD D. MACKINTOSH, OF BROOKLYN, NEW YORK, ASSIGNOR OF ONE-HALF TO S. S. HEPWORTH COMPANY, OF NEW YORK, N. Y., A CORPORATION OF NEW YORK.

CENTRIFUGAL-MACHINE UNLOADER.

1,205,128.  Specification of Letters Patent.  Patented Nov. 14, 1916.

Application filed September 4, 1914. Serial No. 860,150.

*To all whom it may concern:*

Be it known that I, EDWARD D. MACKINTOSH, of the borough of Brooklyn, in the city of New York, county of Kings, and State of New York, have invented certain new and useful Improvements in Centrifugal-Machine Unloaders, of which the following is a specification.

It is the object of my invention to unload sugar and other materials from centrifugal machines.

Figure 1:
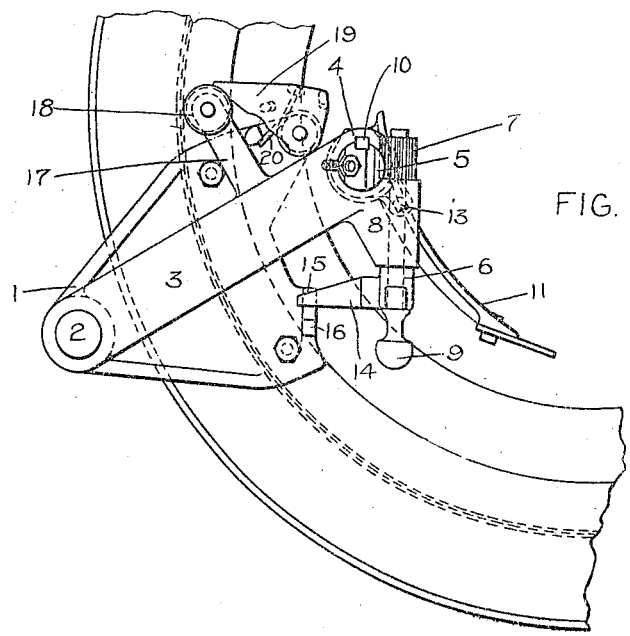
Figure 2:
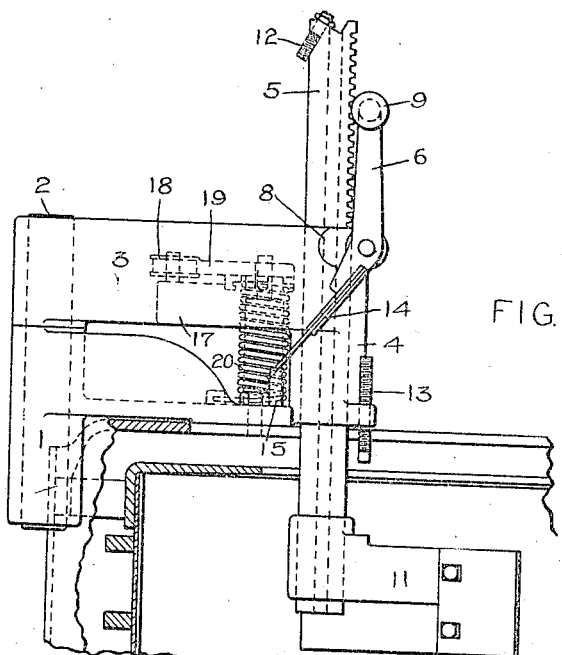

Referring to the accompanying drawings, forming part of this specification: Figure 1 is a top plan of my unloader in place on a centrifugal machine. Fig. 2 is an elevation of the same.

1 is a vertical bearing for a stud 2 secured to one end of a horizontal arm 3. On the other end of the arm is a sleeve 4 that guides a vertical bar 5. This bar is movable vertically in the sleeve by means of a winch 6 and a pinion 7 with teeth that mesh with other teeth on the bar, the winch and the pinion being secured to a shaft journaled in a lug 8 that forms part of the horizontal arm.

The handle 9, of the winch, travels around the shaft in an orbit that is located wholly to one side of the vertical bearing and that is substantially in a plane therewith, the object being to avoid any considerable tendency to swing the horizontal arm when force is applied to the winch handle to move it in the orbit specified.

The vertical bar is kept from turning, in the sleeve that guides it, by means of a feather 10 fitting in a groove in the bar and secured in the sleeve; and to the lower end of the bar is fixed a plow 11. A screw 12 forms a stop to keep the plow from quite touching the bottom of the basket of the centrifugal machine, and another screw, 13, keeps it from quite touching the top of the basket.

The idle position of the plow is that shown by the drawings. To retain it in such position the winch is provided with a tail 14 which bears against a stop 15, such stop having a teat 16 which confines the tail and prevents it from slipping forward to where the plow would become active.

Forming part of the arm is a spur 17 to which is pivoted a roller 18 coöperating with a cam 19 that is swingable about a fixed vertical axis, a spring 20 acting to press the cam forcibly against the roller. The function of these parts is to urge the plow outwardly, under the basket top 21, while in action.

To operate the unloader, the winch is turned to the right, to a horizontal position, thereby raising the plow into contact with the screw 13. It is then pulled forward, thereby swinging the horizontal arm about the axis of the bearing 1 and carrying the plow under the basket top and into the material to be unloaded, the cam assisting. When the plow has reached its extreme forward position, against the basket wall, it is lowered, by turning the winch, till the screw 12 strikes the arm 3, the basket being turned slowly, meantime, in a clockwise direction, so as to force its contents along the concave face of the plow and to the central discharge opening regularly provided in the bottom of such baskets as my device is designed to unload.

When returning the parts to the idle position it is convenient to let go of the winch while it is still in a horizontal position and the plow is at its highest point. To prevent destructive hammering, when this is done, the tail 14 is made in the form of a spring.

What I claim as new, and desire to secure by Letters Patent, is:

1. In an unloader for centrifugal machines, a fixed vertical bearing, a horizontal arm swingably supported by the bearing, a vertical bar guided by the arm and movable only vertically in relation thereto, and a plow fixed to the vertical bar.

2. In an unloader for centrifugal machines, a fixed vertical bearing, a horizontal arm swingably supported by the bearing, a toothed vertical bar guided by the arm and movable only vertically in relation thereto, a pinion with teeth that mesh with the teeth on the bar, a shaft carried by the arm and secured to the pinion, a winch secured to the shaft and with its handle traveling in an orbit located wholly to one side of the vertical bearing and substantially in a plane therewith, and a plow fixed to the vertical bar.

3. In an unloader for centrifugal machines, a fixed vertical bearing, a horizontal arm swingably supported by the bearing, a toothed vertical bar guided by the arm and movable only vertically in relation thereto, a pinion with teeth that mesh with the teeth on the bar, a shaft carried by the arm and secured to the pinion, a winch secured to the shaft and with its handle traveling in an orbit located wholly to one side of the vertical bearing, and substantially in a plane therewith, a plow fixed to the vertical bar, and a stop against which the winch bears when the plow is in its position of rest.

4. In an unloader for centrifugal machines, a fixed vertical bearing, a horizontal arm swingably supported by the bearing, a vertical bar guided by the arm and movable only vertically in relation thereto, a plow fixed to the vertical bar, a horizontal roller carried by the arm, a cam swingable about a fixed vertical axis and bearing on the roller, and a spring acting to press the cam against the roller.

5. In an unloader for centrifugal machines, a fixed vertical bearing, a horizontal arm swingably supported by the bearing, a toothed vertical bar guided by the arm and movable only vertically in relation thereto, a pinion with teeth that mesh with the teeth on the bar, a shaft carried by the arm and secured to the pinion, a winch secured to the shaft and with its handle traveling in an orbit located wholly to one side of the vertical bearing and substantially in a plane therewith, a plow fixed to the vertical bar, a horizontal roller carried by the arm, a cam swingable about a fixed vertical axis and bearing on the roller, and a spring acting to press the cam against the roller.

In testimony whereof I have signed my name to this specification in the presence of two subscribing witnesses.

EDWARD D. MACKINTOSH.

Witnesses:
FRANK J. CREED,
B. VAN NAMI.